United States Patent [19]

Murakami et al.

[11] Patent Number: 4,792,474
[45] Date of Patent: Dec. 20, 1988

[54] OPTICAL MEMORY ELEMENT

[75] Inventors: Yoshiteru Murakami, Nishinomiya; Akira Takahashi, Nara; Yoshikazu Fujii, Nara; Hiroyuki Katayama, Nara; Kenji Ohta, Nara, all of Japan

[73] Assignee: Sharp Kabushiki Kaisha, Osaka, Japan

[21] Appl. No.: 908,716

[22] Filed: Sep. 18, 1986

[30] Foreign Application Priority Data

Sep. 24, 1985 [JP] Japan .................................. 60-211660

[51] Int. Cl.$^4$ ........................... B32B 3/02; B32B 9/00; G01D 15/10; G01D 9/00
[52] U.S. Cl. ...................................... 428/64; 428/698; 430/945; 346/76 L; 346/135.1
[58] Field of Search .................. 428/698, 64; 430/945; 346/76 L, 135.1

[56] References Cited

U.S. PATENT DOCUMENTS

| 4,308,545 | 12/1981 | Lehureau et al. | 346/135.1 |
|---|---|---|---|
| 4,433,340 | 2/1984 | Mashita et al. | 346/135.1 |
| 4,450,201 | 5/1984 | Brill et al. | 428/336 |
| 4,510,593 | 4/1985 | Daniels | 369/283 |
| 4,525,415 | 6/1985 | Corat | 428/216 |
| 4,600,625 | 7/1986 | Abe et al. | 428/167 |
| 4,619,865 | 10/1986 | Keem et al. | 428/333 |

FOREIGN PATENT DOCUMENTS

| 0099208 | 1/1984 | European Pat. Off. | |
| 0120539 | 10/1984 | European Pat. Off. | |
| 0130399 | 1/1985 | European Pat. Off. | |
| 2164061 | 3/1986 | United Kingdom | 428/698 |

Primary Examiner—John E. Kittle
Assistant Examiner—Patrick J. Ryan
Attorney, Agent, or Firm—Birch, Stewart, Kolasch & Birch

[57] ABSTRACT

An optical memory element comprises a substrate, a recording medium layer and an aluminum silicon nitride film laminated in this order.

12 Claims, 2 Drawing Sheets

OPTICAL MEMORY ELEMENT

BACKGROUND OF THE INVENTION

The present invention relates to an optical memory element with wiich at least one of information recording, reproducing and erasing operations is performed through application of a laser beam.

Recently, various R & D efforts have been made in many fields to meet the increasing demand for optical memory elements of higher density and larger capacity. Particularly, an add-on memory with which the user can add information and an add-on and erasable memory with which the user can add information or erase the recorded information have a wide range of the applications. Various materials and systems have found been therefore proposed for these types of optical memory elements. TeOx, TeSe or TeC may be used as materials for former memory systems, while a thin film made of a rare earth transition metal alloy such as GdTbGe, GdTbDyFe or TbFeCo may be used as a material for such memory elements. However, many of these materials used for a recording medium, which is a key component of the add-on or the add-on and erasable memory lack corrosion resistance or are easily oxidized. The oxidization of the recording medium results in diminished recording sensitivity.

SUMMARY OF THE INVENTION

In view of the foregoing, an object of the present invention is to provide an optical memory element with enhanced recording sensitivity while providing a recording medium which is reliable in resistance against oxidization by oxygen.

Other objects and further scope of applicability of the present invention will become apparent from the detailed description given hereinafter. It should be understood, however, that the detailed description and specific examples, while indicating preferred embodiments according the invention is provided which, are given by way of illustration only, since various changes and modifications within the spirit and scope of the invention will become apparent to those skilled in the art from that detailed description.

To achieve the above objects, an optical memory element of an embodiment of the present invention comprises a substrate, a recording medium layer and an dielectric layer made of aluminum silicon nitride film laminated in this order.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

Prior to description of an optical memory element of an embodiment of the present invention, oxidization of magneto-optic memory element with which users can add or erase information is described using an example.

Figure 8:
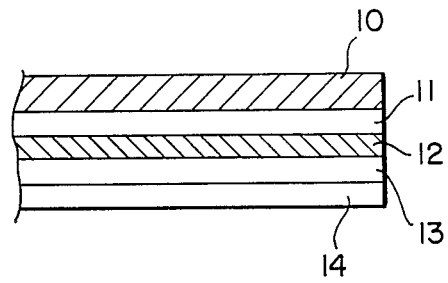
FIG. 8 is a fragmentary sectional side view of an example of the conventional optical memory element for comparison with the optical memory element of the present invention.

FIG. 8 is a fragmentary sectional side view of the conventional magneto-optic memory element investigated by the inventors of the present invention. Layer 10 is a glass substrate on which a first transparent dielectric protective layer or SiO film 11 (about 120 nm in thickness) is formed. A rare earth transition metal alloy thin film or GdTbFe alloy thin film 12 (about 15 nm thick) is formed as a recording medium on the SiO film 11. A second transparent dielectric protective layer or $SiO_2$ film 13 (about 50 nm thick) is deposited on the GdTbFe alloy thin film 12 and finally a Cu layer 14 (about 50nm thick) is formed as a reflective layer on the $SiO_2$ film 13. The high temperature high humid test was conducted on the magneto-optic memory element of the above construction. As a result, it has been revealed that the GdTbFe alloy thin film 12 is oxidized. The inventors have recognized that the oxidization is caused by oxygen contained in the SiO film 11 and the $SiO_2$ film 13; oxygen separates from the SiO film 11 or the $SiO_2$ film 13 while or after the film is formed, and the oxygen thus separated oxidizes the GdTbFe alloy thin film 12. Since oxidization of the rare earth metal-transition metal alloy thin film 12 seriously impairs the performance of the magnetized recording medium, the oxidization is a serious problem for optical memory elements. With a rare earth transition metal alloy thin film 12 of a smaller film thickness, oxidization, however negligible as it may be, gives a large influence, and therefore must be avoided with the greatest care. Accordingly, the applicant has proposed to use aluminum nitride or the like substance with no oxygen content as the protective film of the rare earth transition metal alloy thin film 12.

The optical memory element for such construction is disclosed in U.S. patent application Ser. No. 697,027 filed on Jan. 31, 1985, entitled "MAGNETOOPTIC MEMORY DEVICE" by Kenji OHTA et al. (This application is a continuation application of Ser. No. 489,889 filed Apr. 29, 1983 which is now abandoned.) The European counterpart is Application No. 83302419.3 filed on Apr. 28, 1983.

However, since aluminum nitride has a high thermal conductance and requires high laser power in recording information, an optical memory element using aluminum nitride possibly provides low recording sensitivity.

An embodiment of the optical memory element of the present invention is now described in detail below with reference to the accompanying drawings.

Figure 1:
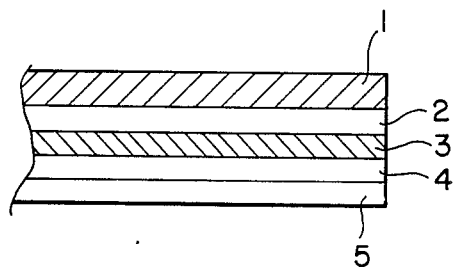
FIG. 1 is a fragmentary sectional side view showing the construction of an embodiment of an optical memory element of the present invention.

FIG. 1 is a fragmentary sectional side view showing the construction of an embodiment of the optical memory element of the present invention. Layer 1 is a transparent substrate made of glass, polycarbonate or acrylic. A first transparent dielectric layer 2 made of aluminum silicon nitride is formed on the transparent substrate 1. A rare earth transition metal alloy thin film 3 (such as GdTbFe, GdTbDyFe or TbFeCo) is formed as a recording medium on the aluminum silicon nitride film 2. A second transparent dielectric layer 4 made of aluminum silicon nitride is formed on the rare earth transition metal alloy thin film 3, and finally a reflective layer 15 made of Cu, Ag or Al is formed on the second transparent dielectric layer 4. The optical memory element of the above construction is advantageous in the following points:

1 Aluminum silicon nitride is extremely stable and can be made into a finer film than oxides.

2 Aluminum silicon nitride which does not contain oxygen can substantially reduce the possibility of oxidization of the recording medium layer.

Figure 2:
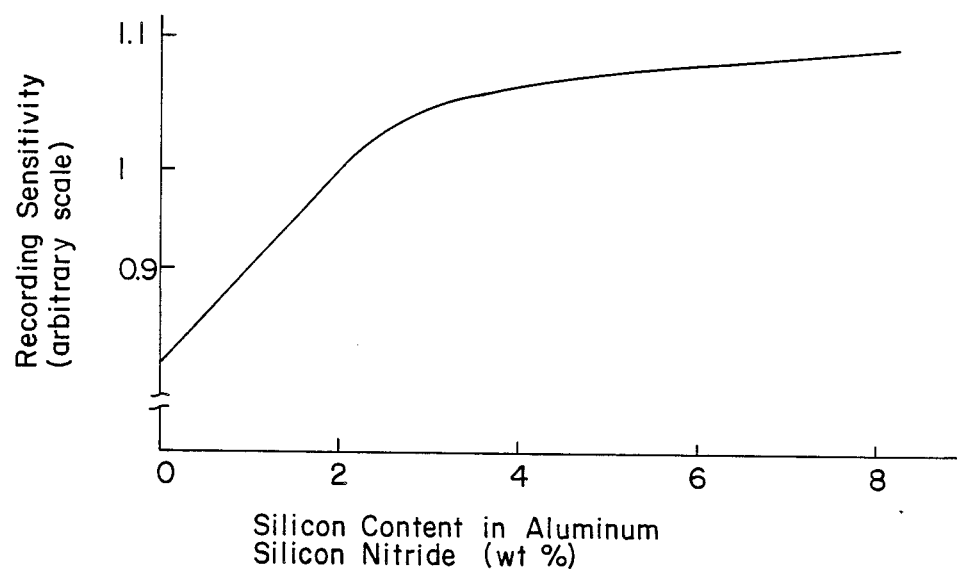
FIG. 2 is a graphical chart of measured recording sensitivity of the optical memory element.

3 Aluminum nitride also has the properties of the above items 1 and 2, but aluminum silicon nitride has lower thermal conductance than aluminum nitride and therefore is more effective in enhancing the sensitivity for recording on the recording medium. An experiment was conducted to verify these advantages of the aluminum silicon nitride. The recording sensitivity of aluminum silicon nitride film used for the first and second dielectric layers of the optical memory element of FIG. 1 was measured, varying the silicon content (wt %) from 0 to 8%. The result is shown in FIG. 2. The recording sensitivity from the bit size obtained when recorded at a specified power was estimated. As clear from FIG. 2, the recording sensitivity is higher with the aluminum silicon nitride film than with the aluminum nitride film as a dielectric layer.

Figure 3:
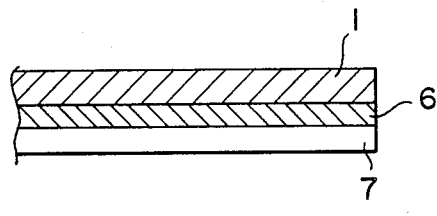
FIGS. 3 through 7 are fragmentary sectional side views showing the constructions of other embodiments of the present invention.
Figure 6:
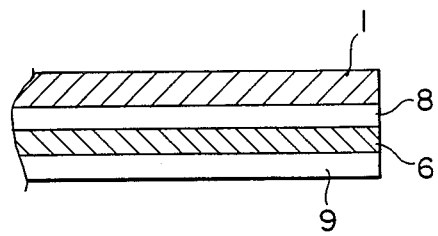
Figure 4:
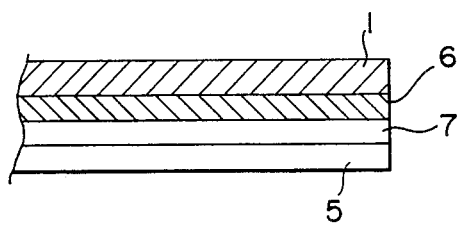
Figure 7:
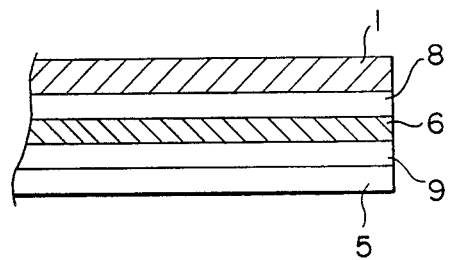
Figure 5:
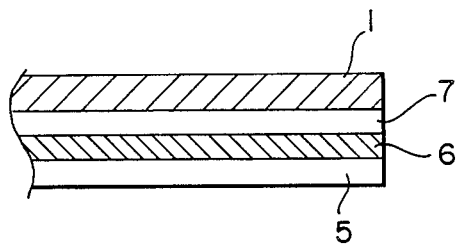

Thus, according to the present invention, the aluminum silicon nitride film is used for the protection of the recording medium and for increased recording sensitivity. Whatever material may be used for the recording medium, the optical memory element of the present invention may be of any construction as long as aluminum silicon nitride is used for at least one of the layers of the construction. FIGS. 3 through 7 show possible constructions of the optical memory element of the present invention. In FIG. 3, a recording medium layer 6 and an aluminum silicon nitride film 7 are disposed in this order on a transparent substrate 1. In FIG. 4, a recording medium layer 6, an aluminum silicon nitride film 7 and a reflective layer 5 are disposed in this order on a transparent substrate 1. In FIG. 5, an aluminum silicon nitride film 7, a recording medium layer 6 and a reflective layer 5 are disposed in this order on a transparent substrate 1. In FIG. 6, a first dielectric layer 8, a recording medium layer 6 and second dielectric layer 9 are disposed in this order on a transparent substrate 1, and at least either of the first and second dielectric layers is made of aluminum silicon nitride. In FIG. 7, a first dielectric layer 8, a recording medium layer 6, a second dielectric layer 9 and a reflective layer 5 are disposed in this order on a transparent substrate 1, and at least either of the first and second dielectric layers is made of aluminum silicon nitride.

According to the present invention, as understood from above, the optical memory element provides higher oxidization resistance of the recording medium and better information-recording and reproducing performance.

The recording medium material of an add-on memory may be TeOx, TeSe or TeC and that of an add-on and erasable memory may be GdTbFe, GdTbDyFe or TbFeCo.

The substrate, recording medium layer, dielectric layer and reflective layer of the optical memory element of the present invention may have the following film thicknesses:

| | |
|---|---|
| Substrate | About 0.5~about 2 mm or preferably about 1.2 mm |
| Recording medium layer | About 100~about 2.000Å |
| Dielectric layer | About 100~about 3.000Å |
| Reflective layer | About 100~about 1.000Å |

Information was recorded under the same condition in the optical memory element containing aluminum nitride and the one containing aluminmm silicon nitride, to measure the bit size available for recording as well as the recording sensitivity. The result was that the bit size is larger and the sensitivity is higher in the latter memory element than the former one. In addition since aluminum silicon nitride has a lower thermal conductance, it effects lower heat energy loss. As a result, the magnetized recording medium layer in which information is actually recorded has larger thermal absorption. The silicon content of the aluminum silicon nitride film is preferably about 2 wt % or more although only a small amount of silicon can yield the expected effect.

While only certain embodiments of the present invention have been described, it will be apparent to those skilled in the art that various changes and modifications may be made therein without departing from the spirit and scope of the present invention as claimed.

What is claimed is:

1. An optical memory element comprising:
   a substrate;
   a recording medium layer; and
   a dielectric layer made of an aluminum silicon nitride film.

2. The optical memory element of claim 1, wherein the recording medium layer is disposed on the substrate, and the dielectric layer made of an aluminum silicon nitride film is disposed on the recording medium layer.

3. The optical memory element of claim 1, wherein the dielectric layer made of aluminum silicon nitride film is disposed on the substrate, and the recording medium layer is disposed on the dielectric layer.

4. The optical memory element of claim 2, further comprising a reflective layer formed on the dielectric layer.

5. The optical memory element of claim 3, further comprising a reflective film formed on the recording medium layer.

6. An optical memory element comprising:
   a substrate;
   a first dielectric layer;
   a recording medium layer; and
   a second dielectric layer, wherein at least one of the first and second dielectric layers is an aluminum silicon nitride film.

7. The optical memory element of claim 6, wherein the first dielectric layer is formed on the substrate, the recording medium layer is formed on the first dielectric layer and the second dielectric layer is formed on the recording medium layer.

8. The optical memory element of claim 7, further comprising a reflective layer formed on the second dielectric layer.

9. An optical memory element having a high recording sensitivity and a lower heat energy loss which comprises as a layered construction:
   a transparent substrate made of glass,
   a polycarbonate or an acrylic material,
   a first transparent dielectric layer formed on the transparent substrate, a rare earth transition metal alloy thin film formed as a recording medium on the first transparent dielectric layer, a second transparent dielectric layer formed on the rare earth transition metal alloy thin film, and a reflective layer formed on the second transparent dielectric layer, at least one of said first and second transparent dielectric layers being an aluminum silicon nitride film.

10. The optical memory element of claim 1 wherein the silicon content in the aluminum silicon nitride film is at least about 2% by weight.

11. The optical memory element of claim 9 wherein the silicon content in the aluminum silicon nitride film is at least about 2% by weight.

12. The optical memory element of claim 1 wherein the silicon content in the aluminum silicon nitride film is about 2-8% by weight.

* * * * *